United States Patent [19]

Parrish et al.

[11] Patent Number: 5,718,151
[45] Date of Patent: Feb. 17, 1998

[54] STEERING WHEEL MOUNTING

[75] Inventors: Jeffrey Lee Parrish, Troy; Paul Louis Schmitz, Shelby, both of Mich.

[73] Assignee: Breed Automotive Technology, Inc., Lakeland, Fla.

[21] Appl. No.: 724,452

[22] Filed: Oct. 1, 1996

[51] Int. Cl.$^6$ ........................................ B62D 1/04
[52] U.S. Cl. ........................ 74/552; 403/259; 403/359
[58] Field of Search ........................ 74/552, 492, 433; 403/259, 374, 354 G, 365; 464/160, 161

[56] References Cited

U.S. PATENT DOCUMENTS

| | | | |
|---|---|---|---|
| 1,256,706 | 2/1918 | Lewis | 411/366 |
| 1,707,353 | 4/1929 | Fraser | 403/354 |
| 3,471,184 | 10/1969 | Herczeg | 403/261 |
| 3,811,215 | 5/1974 | Fleischer | 43/18.1 |
| 3,910,597 | 10/1975 | Seko | 74/552 |
| 4,390,193 | 6/1983 | Straban et al. | 280/777 |
| 4,418,582 | 12/1983 | Martin | 403/374 X |
| 4,509,720 | 4/1985 | Griffin et al. | 251/308 |
| 4,624,596 | 11/1986 | Eckendorff | 403/4 |
| 4,662,775 | 5/1987 | Faul | 403/365 |
| 4,674,354 | 6/1987 | Brand | 74/492 |
| 4,721,008 | 1/1988 | Stoops et al. | 74/552 |
| 4,771,650 | 9/1988 | Kerner | 74/498 |
| 4,893,520 | 1/1990 | Endo et al. | 74/552 |
| 4,938,094 | 7/1990 | Cochard | 74/552 |
| 5,144,861 | 9/1992 | Nishijima et al. | 74/552 |
| 5,398,568 | 3/1995 | Worrell et al. | 74/552 |

*Primary Examiner*—Vinh T. Luong
*Attorney, Agent, or Firm*—Lonnie Drayer

[57] ABSTRACT

A steering wheel is assembled with an inflatable vehicle occupant restraint before the steering wheel is mounted on a steering shaft. The steering wheel is assembled with a steering shaft by sliding the steering shaft into a bore in the hub of the steering wheel. The steering wheel is secured to the steering shaft by a retaining nut disposed on the side of the hub of the steering wheel which is distal from the rim of the steering wheel.

2 Claims, 2 Drawing Sheets

5,718,151

STEERING WHEEL MOUNTING

The present invention relates a method and apparatus for securing a steering wheel to a shaft.

BACKGROUND OF THE INVENTION

Heretofore steering wheels have been secured to steering shafts by having the steering shaft extend through a bore in the hub of the steering wheel and threading a nut onto a threaded portion of the steering shaft on the side of the steering wheel hub which is proximal to the rim of the steering wheel. Therefore, if the steering wheel is assembled with an inflatable vehicle occupant system located on the side of the steering wheel hub which is proximal to the rim of the steering wheel, the assembly of the steering wheel with the inflatable vehicle occupant system must be completed after the steering wheel has been secured with the steering shaft. The invention disclosed herein allows the steering wheel to be mounted on a steering shaft after the inflatable vehicle occupant system has been assembled with the steering wheel on the side of the steering wheel hub which is proximal to the rim of the steering wheel.

SUMMARY OF THE INVENTION

There is provided in accordance with one aspect of the invention an assembly of a steering wheel and a shaft comprising: (a) a steering wheel having a hub with spokes extending therefrom to a rim, the hub having a projection extending therefrom on a side of the hub distal from said rim, said projection having a bore therein, the bore in said projection being splined; (b) a shaft having an end at which the exterior surface of the shaft is splined, the spline on the shaft and the spline in the bore of the projection of the hub of the steering wheel being complementary to one another; and (c) means for securing said shaft and said steering wheel in a fixed relationship with respect to the longitudinal axis of the shaft, the projection and shaft being secured in a fixed relationship with respect to the longitudinal axis of the shaft by said means for securing with the means for securing being disposed on the same side of the hub of the steering wheel as said projection.

There is provided in accordance with another aspect of the invention an assembly of a steering wheel and a shaft comprising: (a) a steering wheel having a hub with spokes extending therefrom to a rim, the hub having a projection extending therefrom on a side of the hub distal from said rim, said projection having a bore therein, an exterior surface of the projection being threaded and the bore in said projection being splined; (b) a shaft having an end at which the exterior surface of the shaft is splined, the spline on the shaft and the spline in the bore of the projection of the hub of the steering wheel being complementary to one another, the shaft having a collar located near the spline on the shaft; and (c) a retaining nut having a stepped bore therethrough, a first portion of the stepped bore having a diameter that is larger than the external diameter of said shaft and smaller than the diameter of the collar of said shaft, a second portion of the stepped bore being threaded and having a diameter that is larger than the diameter of the collar of said shaft, the threads of the second portion of the stepped bore being complementary to the threads of the exterior surface of the projection of the steering wheel hub; the splined portion of the shaft being located in the bore of the projection of said hub with the splines in a mating relationship, and the steering wheel and shaft being secured in a fixed relationship with respect to the longitudinal axis of the shaft by the retaining nut which is mounted on the shaft on the side of the collar distal from the projection of the steering wheel hub and is in threaded engagement with said projection.

There is provided in accordance with yet another aspect of the invention a method of attaching a steering wheel to a shaft comprising the steps of: (a) providing a steering wheel having a hub with spokes extending therefrom to a rim, the hub having a projection extending therefrom on a side of the hub distal from said rim, said projection having a bore therein which is splined; (b) providing a shaft having an end at which the exterior surface of the shaft is splined, the spline on the shaft and the spline in the bore of the projection of the hub of the steering wheel being complementary to one another; (c) mating the spline of the shaft with the spline in the projection of the steering wheel hub; and (d) securing the shaft in a fixed relationship with the projection of the steering wheel hub with respect to the longitudinal axis of the shaft with a means for securing which is disposed on the same side of the hub of the steering wheel as said projection.

Still other benefits and advantages of the invention will become apparent to those skilled in the art to which it pertains upon a reading and understanding of the following detailed description.

BRIEF DESCRIPTION OF THE DRAWINGS

The invention may take physical form in certain parts and arrangement of parts, a preferred embodiment of which will be described in detail in this description and illustrated in the accompanying drawings which form a part hereof and wherein.

DETAILED DESCRIPTION OF THE INVENTION

Figure 1:
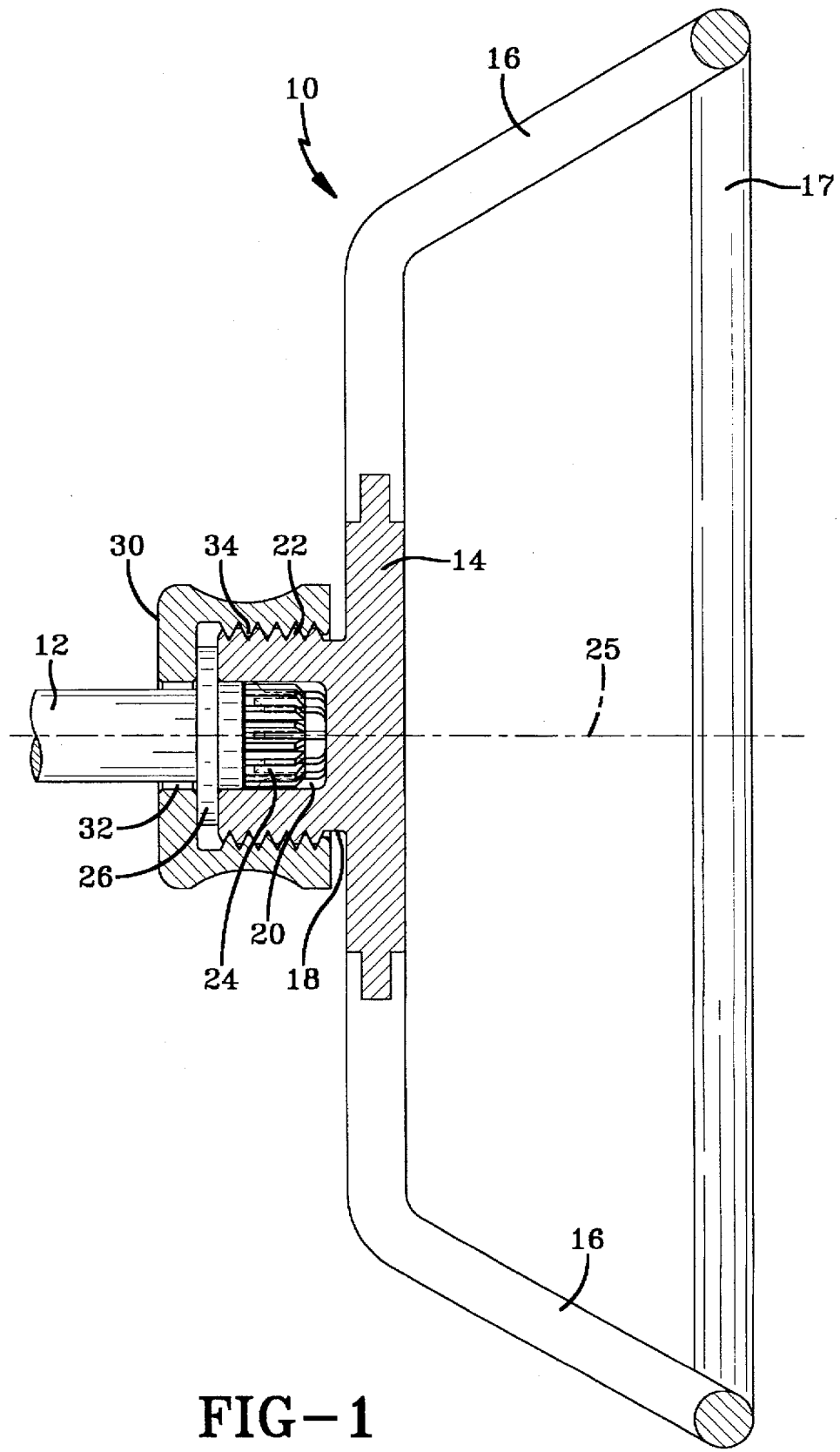
FIG. 1 is a side elevation cross-sectional view of an assembly of a steering wheel and shaft in accordance with the invention.

Referring first to FIG. 1 there is shown a side elevation cross-sectional view of an assembly of a steering wheel 10 and shaft 12 in accordance with the invention. The steering wheel has a hub 14 with spokes 16 extending therefrom to a rim 17. The hub 14 having a projection 18 extending therefrom on a side of the hub distal from said rim 17. The projection has a bore 20 therein. In this preferred embodiment, the exterior of the projection is threaded 22 and the bore in projection is splined. While the projection and hub are shown as being a single piece, it is understood that the projection may be a separate piece which is attached to the hub by suitable means for attachment including, for example, welding, press fitting, and threaded attachment.

The shaft 12 has an end at which the exterior surface of the shaft is splined 24. The spline 24 on the shaft and the spline in the bore of the projection of the hub of the steering wheel are complementary to one another. This splined configuration causes the shaft and steering wheel to rotate simultaneously without slippage between them. In this preferred embodiment the shaft has a collar 26 located near the spline 24 on the shaft.

The projection 18 and shaft 12 are secured in a fixed relationship with respect to the longitudinal axis 25 of the shaft by a means for securing 30, with the means for securing being disposed on the same side of the hub of the steering wheel as said projection. In this preferred embodiment the means for securing is a retaining nut 30. Preferably the retaining nut has a stepped bore therethrough. A first portion 32 of the stepped bore has a diameter that is larger than the external diameter of the shaft 12 and smaller than the diameter of the collar 26 of said shaft. A second portion 34 of the stepped bore is threaded and has a diameter that is larger than the diameter of the collar 12 of said shaft. The threads of the second portion of the stepped bore 34 are complementary to the threads 22 of the exterior of the projection of the steering wheel hub.

The steering wheel 10 is assembled with the shaft 12 by mating the spline of the shaft with the spline in the projection of the steering wheel hub and thereafter securing the shaft in a fixed relationship with the steering wheel with respect to the longitudinal axis of the shaft with a means for securing which is disposed on the same side of the hub of the steering wheel as said projection. In this preferred embodiment the splined portion of the shaft is located in the bore of the projection of the hub with the splines in a mating relationship. The steering wheel 10 and shaft 12 are secured in a fixed relationship with respect to the longitudinal axis 25 of the shaft by the retaining nut 30 which is mounted on the shaft on the side of the collar 26 distal from the projection of the steering wheel hub and is in threaded engagement with said projection.

While in this exemplary preferred embodiment the retaining nut is secured to the projection by threads, it is understood that an unthreaded retaining member may be substituted for the retaining nut and may be secured in fixed relationship to the projection of the steering wheel hub by any suitable securing means including, for example, welding, pinning, lock rings, interference fit, or a combination of suitable securing means.

Figure 2:
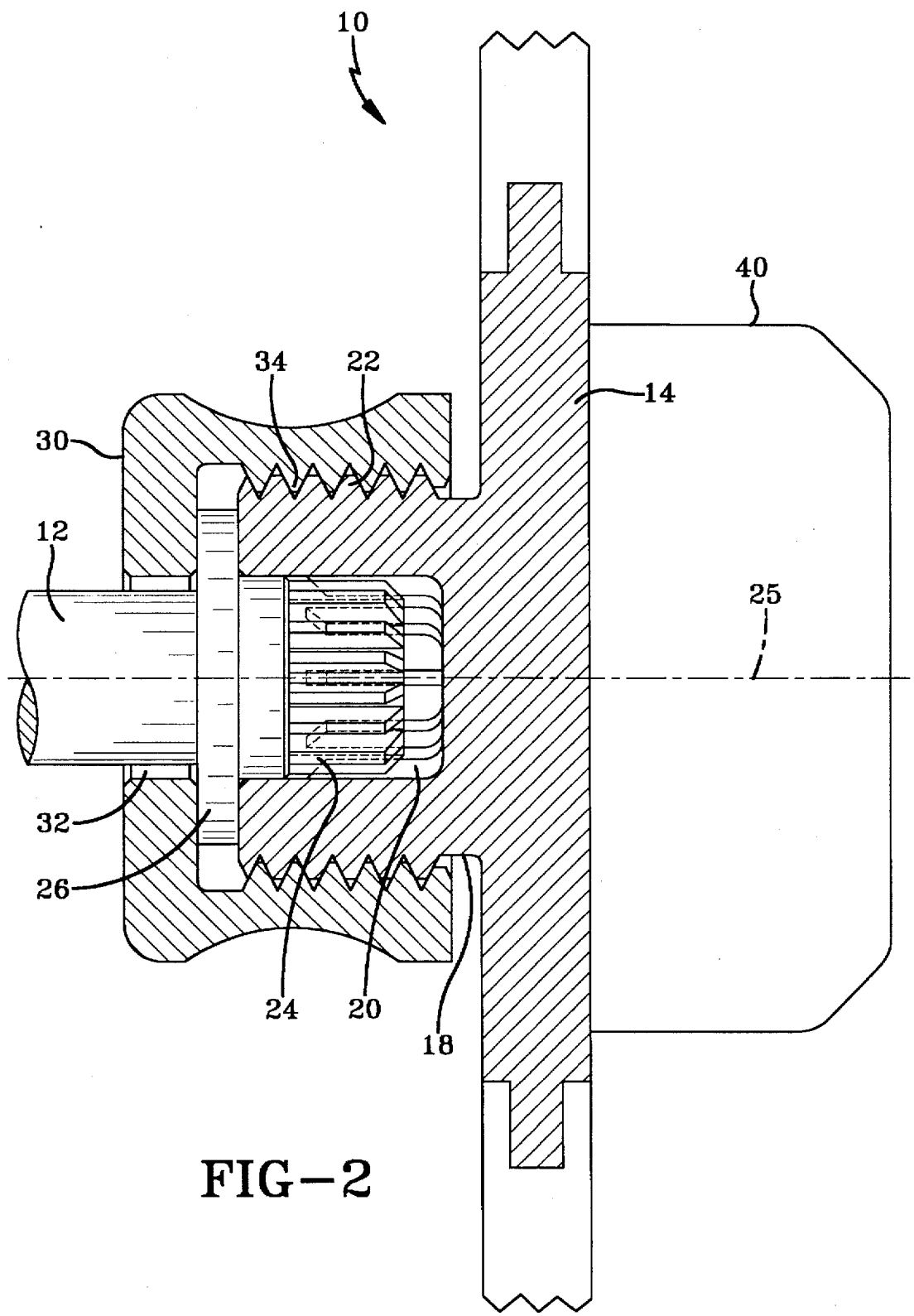
FIG. 2 is a side elevation cross-sectional view of an assembly of a steering wheel and shaft in accordance with an alternative embodiment of the invention.

Referring next to FIG. 2 there is shown a side elevation cross-sectional view of an assembly of a steering wheel 10 and shaft 12 in accordance with an alternative embodiment of the invention. In this embodiment the steering wheel further comprises an inflatable vehicle occupant restraint 40 assembled with the hub 14 of the steering wheel on the side of the hub which is distal from the projection 18.

While certain representative embodiments and details have been presented for the purpose of illustrating the invention, it will be apparent to those skilled in the art that various changes and modifications may be made therein without departing from the spirit and scope of the invention.

What is claimed is:

1. An assembly comprising:

(a) a steering wheel having a hub with spokes extending therefrom to a rim, the hub having a projection extending therefrom on a side of the hub distal from said rim, said projection having a bore therein, an exterior of the projection being threaded and the bore in said projection being splined;

(b) a shaft having an end at which the exterior surface of the shaft is splined, the spline on the shaft and the spline in the bore of the projection of the hub of the steering wheel being complementary to one another, the shaft having a collar located near the spline on the shaft; and (c) a retaining nut having a stepped bore therethrough, a first portion of the stepped bore having a diameter that is larger than the external diameter of said shaft and smaller than the diameter of the collar of said shaft, a second portion of the stepped bore being threaded and having a diameter that is larger than the diameter of the collar of said shaft, the threads of the second portion of the stepped bore being complementary to the threads of the exterior surface of the projection of the steering wheel hub; the splined portion of the shaft being located in the bore of the projection of said hub with the splines in a mating relationship, and the steering wheel and shaft being secured in a fixed relationship with respect to the longitudinal axis of the shaft by the retaining nut which is mounted on the shaft on the side of the collar distal from the projection of the steering wheel hub and is in threaded engagement with said projection.

2. An assembly according to claim 1 wherein the steering wheel further comprises an inflatable vehicle occupant restraint assembled with the hub of the steering wheel on the side of the hub which is distal from said projection.

* * * * *